(12) United States Patent
Fischer et al.

(10) Patent No.: US 8,401,575 B2
(45) Date of Patent: Mar. 19, 2013

(54) NETWORK SIGNALING FOR POINT-TO-MULTIPOINT SERVICE OVER SINGLE FREQUENCY NETWORK MODE

(75) Inventors: Patrick Fischer, Bourg la Reine (FR); Sergey Karmanenko, Moscow (RU); Victor Redkov, Moscow (RU)

(73) Assignee: LG Electronics Inc., Seoul (KR)

( * ) Notice: Subject to any disclaimer, the term of this patent is extended or adjusted under 35 U.S.C. 154(b) by 560 days.

(21) Appl. No.: 12/139,286

(22) Filed: Jun. 13, 2008

(65) Prior Publication Data

US 2008/0311926 A1 Dec. 18, 2008

Related U.S. Application Data

(60) Provisional application No. 60/944,405, filed on Jun. 15, 2007.

(51) Int. Cl.
*H04W 4/00* (2009.01)
(52) U.S. Cl. ............... 455/466; 455/412.1; 455/414.1; 455/450; 455/464
(58) Field of Classification Search ............. 455/412.1, 455/414.1, 450, 464, 466
See application file for complete search history.

(56) References Cited

U.S. PATENT DOCUMENTS

| | | | | |
|---|---|---|---|---|
| 5,950,127 | A | * | 9/1999 | Nitta et al. ............. 455/428 |
| 2007/0115796 | A1 | * | 5/2007 | Jeong et al. ............ 370/203 |
| 2008/0298336 | A1 | * | 12/2008 | Gollamudi ............. 370/343 |
| 2009/0213775 | A1 | * | 8/2009 | Rey et al. .............. 370/312 |

FOREIGN PATENT DOCUMENTS

| | | |
|---|---|---|
| CN | 1669268 | 9/2005 |
| EP | 1631000 | 3/2006 |
| EP | 1694086 | 8/2006 |
| GB | 2390785 | 1/2004 |
| WO | 2007059791 | 5/2007 |

OTHER PUBLICATIONS

Ericsson "MBSFN channel model" TSG-RAN WG4 #43, May 2007.
Ericsson "Measurements and MBMS (MBSFN) subframes" TSG-RAN WG1 #49, May 2007.
RAN2, "Physical layer enhancements for MBMS," R2-072336, 3GPP TSG-WG2 Meeting #58, May 2007, XP-050135174.
IP Wireless et al., "MBMS TDD and FDD Physical Layer Improvements," R2-071335, 3GPP TSG-RAN WG2 #57bis, Mar. 2007, XP-050134283.
LG Electronics, "CR 26.346-0098 Addition of information on MBMS SFN mode into MBMS bearer mode declaration," S4-070436, 3GPP TSG-SA WG4 Meeting #44, Jun. 2007, XP-050289494.
LG Electronics, "LS on MBSFN cluster selection and reselection, and suitability criteria", 3GPP TSG RAN WG2 Meeting #57bis, Mar. 2007.

* cited by examiner

*Primary Examiner* — Patrick Edouard
*Assistant Examiner* — Matthew Genack
(74) *Attorney, Agent, or Firm* — Lee, Hong, Degerman, Kang & Waimey

(57) ABSTRACT

The present invention relates to communicating between a network and a mobile terminal in a wireless communication system. The invention includes receiving a message from the network for announcing a service. The message includes an attribute for identifying whether the service is to be received according to a specific mode. The specific mode is a mode wherein information is communicated on a frequency having no associated uplink service. The attribute is included in the message according to a session description protocol describing the service.

4 Claims, 16 Drawing Sheets

Logical channels mapped onto transport channels, seen from the UE side
PRIOR ART Logical channels mapped onto transport channels, seen from the UTRAN side
PRIOR ART UE State Transitions
PRIOR ART

NETWORK SIGNALING FOR POINT-TO-MULTIPOINT SERVICE OVER SINGLE FREQUENCY NETWORK MODE

CROSS-REFERENCE TO RELATED APPLICATIONS

This application claims the benefit of earlier filing date and right of priority to U.S. Provisional Application No. 60/944, 405, filed on Jun. 15, 2007, the contents of which are hereby incorporated by reference herein in their entirety.

FIELD OF THE INVENTION

The present invention relates to communicating between a network and a mobile terminal in a wireless communication system.

BACKGROUND OF THE INVENTION

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the Iub interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the Iur interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the GS interface, to the gateway GPRS support node (GGSN) 9 via the GN interface, and to the home subscriber server (HSS) via the GR interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the GC interface and to the Internet via the GI interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH) or a shared channel control channel.

The BCCH provides information including information utilized by a terminal to access a system. The PCCH is used by the UTRAN to access a terminal.

For the purposes of a multimedia broadcast/multicast service (MBMS) additional traffic and control channels are introduced in the MBMS standard. The MCCH (MBMS point-to-multipoint control channel) is used for transmission of MBMS control information. The MTCH (MBMS point-to-multipoint traffic channel) is used for transmitting MBMS service data. The MSCH (MBMS Scheduling Channel) is used to transmit scheduling information. The different logical channels that exist are listed in FIG. 3.

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (broadcast channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the radio access channel (RACH). The MAC-m sublayer may handle the MBMS data.

The possible mapping between the logical channels and the transport channels from a UE perspective is given in FIG. 4. The possible mapping between the logical channels and the transport channels from a UTRAN perspective is given in FIG. 5.

The MAC-d sub-layer manages a dedicated channel (DCH), which is a dedicated transport channel for a specific terminal. The MAC-d sublayer is located in a serving RNC (SRNC) that manages a corresponding terminal. One MAC-d sublayer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). Additionally the RRC handles user mobility within the RAN and additional services, such as location services.

The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods.

The different possibilities that exist for the mapping between the radio bearers and the transport channels for a given UE are not all possible all the time. The UE and UTRAN deduce the possible mapping depending on the UE state and the procedure that the UE and UTRAN are executing. The different states and modes are explained in more detail below, as far as they concern the present invention.

The different transport channels are mapped onto different physical channels. For example, the RACH transport channel is mapped on a given PRACH, the DCH can be mapped on the DPCH, the FACH and the PCH can be mapped on a secondary common control physical channel (S-CCPCH), and the DSCH is mapped on the PDSCH. The configuration of the physical channels is given by RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode.

Because an RRC connection exists for terminals in RRC connected mode, the UTRAN can determine the existence of a particular terminal within the unit of cells. For example, the UTRAN can determine in which cell or set of cells an RRC connected mode terminal is located and to which physical channel the UE is listening. Thus, the terminal can be effectively controlled.

In contrast, the UTRAN cannot determine the existence of a terminal in idle mode. The existence of idle mode terminals can only be determined by the core network to be within a region that is larger than a cell, for example, a location or a routing area. Therefore, the existence of idle mode terminals is determined within large regions, and in order to receive mobile communication services such as voice or data, the idle mode terminal must move or change into the RRC connected mode. The possible transitions between modes and states are shown in FIG. 6.

A UE in RRC connected mode can be in different states, such as CELL_FACH state, CELL_PCH state, CELL_DCH state, or URA_PCH state. Depending on the state, the UE carries out different actions and listens to different channels.

For example, a UE in CELL_DCH state will try to listen to DCH type of transport channels, among others. DCH types of transport channels include DTCH and DCCH transport channels, which can be mapped to a certain DPCH, DPDSCH or other physical channels.

The UE in CELL_FACH state will listen to several FACH transport channels, which are mapped to a certain S-CCPCH. A UE in PCH state will listen to the PICH channel and the PCH channel, which are mapped to a certain S-CCPCH physical channel.

The main system information is sent on the BCCH logical channel which is mapped on a P-CCPCH (primary common control physical channel). Specific system information blocks can be sent on the FACH channel. When the system information is sent on FACH, the UE receives the configuration of the FACH either on the BCCH that is received on P-CCPCH or on a dedicated channel. When system information is sent on the BCCH (i.e., via the P-CCPCH), then in each frame or set of two frames the SFN (system frame number) is sent which is used in order to share the same timing reference between the UE and the Node-B. The P-CCPCH is sent using the same scrambling code as the P-CPICH (primary common pilot channel), which is the primary scrambling code of the cell. The spreading code that is used by the P-CCPCH is of a fixed SF (spreading factor) 256, and the number is one. The UE knows about the primary scrambling code either by information sent from the network on system information of neighboring cells that the UE has read, by messages that the UE has received on the DCCH channel, or by searching for the P-CPICH, which is sent using the fixed SF 256, the spreading code number 0 and which transmits a fixed pattern.

The system information comprises information on neighboring cells, configuration of the RACH and FACH transport channels, and the configuration of MICH and MCCH which are channels that are dedicated channels for the MBMS service.

Each time the UE changes the cell it is camping (in idle mode) or when the UE has selected the cell (in CELL_FACH, CELL_PCH or URA_PCH) state, the UE verifies that it has valid system information. The system information is organized in SIBs (system information blocks), a MIB (master information block) and scheduling blocks. The MIB is sent very frequently and gives timing information of the scheduling blocks and the different SIBs. For SIBs that are linked to a value tag, the MIB also contains information on the last version of a part of the SIBs. SIBs that are not linked to a value tag are linked to an expiration timer. SIBs linked to an expiration timer become invalid and need to be reread if the time of the last reading of the SIB is larger than this timer value. SIBs linked to a value tag are only valid if they have the same value tag as the one broadcast in the MIB. Each block has an area scope of validity (cell, PLMN, equivalent PLMN) which signifies on which cells the SIB is valid. A SIB with area scope "cell" is valid only for the cell in which it has been read. A SIB with area scope "PLMN" is valid in the whole PLMN, a SIB with the area scope "equivalent PLMN" is valid in the whole PLMN and equivalent PLMN.

In general UEs read the system information when they are in idle mode, CELL_FACH state, CELL_PCH state or in URA_PCH state of the cells that they have selected or the cell that they are camping on. In the system information, they receive information on neighboring cells on the same frequency, different frequencies and different RAT (radio access technologies). This allows the UE to know which cells are candidates for cell reselection.

MBMS is introduced in the UMTS standard in the Release 6 of the specification (Rel-6). It describes techniques for optimized transmission of MBMS bearer service including point-to-multipoint transmission, selective combining and transmission mode selection between point-to-multipoint and point-to-point bearers. This is used in order to save radio resources when the same content is sent to multiple users, and enables TV-like services. MBMS data can be split into two categories, control plane information and user plane information. The control plane information contains information on the physical layer configuration, transport channel configuration, radio bearer configuration, ongoing services, counting information, scheduling information, and the like. In order to allow UEs to receive this information, MBMS bearer specific control information for the MBMS is sent to the UEs.

The user plane data of MBMS bearers can be mapped onto dedicated transport channels for a point-to-point service which is sent only to one UE, or on a shared transport channel for point to multipoint service which is transmitted to (and received by) several users at the same time.

Point-to-point transmission is used to transfer MBMS specific control/user plane information, as well as dedicated control/user plane information between the network and a UE in RRC connected mode. It is used for the multicast or the broadcast mode of MBMS. DTCH is used for a UE in CELL_FACH and Cell_DCH. This allows existing mappings to transport channels.

To allow cell resources to be used in an optimized manner, a function called counting has been introduced in MBMS applications. The counting procedure is used to determine how many UEs are interested in the reception of a given service. This is done by using the counting procedure shown in FIG. 7.

For example, a UE that is interested in a certain service receives information of the availability of a MBMS service. The network can inform the UE that it should indicate to the network its interest in the service in the same way such as by transmitting the "access information" on the MCCH channel. A probability factor included in the access information message determines that an interested UE will only respond with a given probability. In order to inform the network that the UE is interested in a given service, the UE will send to the network the RRC connection setup message or the cell update message in the cell that the UE has received the counting information. This message may potentially include an identifier indicating the service that the UE is interested in.

In the case that the network operates on several frequencies, when a UE is camping on one frequency, and a MBMS service is transmitted on a different frequency, a UE may not be aware of the fact that a MBMS service is transmitted in the different frequency. Therefore a frequency convergence procedure allows the UE to receive information in frequency A that indicates in a frequency B that a given service is available.

In general, an MBMS point-to-multipoint Control Channel (MCCH) is a logical channel used for a point-to-multipoint downlink transmission of control plane information between a network and UEs in RRC Connected or Idle Mode. The control plane information on MCCH is MBMS specific and is sent to the UEs in a cell with an activated MBMS service. The MCCH can be sent in the S-CCPCH carrying the DCCH of the UEs in CELL_FACH state, or in a standalone S-CCPCH, or in the same S-CCPCH with MTCH.

The MCCH is mapped to a specific FACH in the S-CCPCH as indicated on the BCCH. In case of soft combining, the MCCH is mapped to a different S-CCPCH (CCTrCH in TDD) than MTCH. Reception of paging has priority over the reception of the MCCH for Idle mode and URA/CELL_PCH UEs. The configuration of the MCCH (modification period, repetition period, etc.) is configured in the system information sent on the BCCH.

In general, an MBMS point-to-multipoint Traffic Channel (MTCH) is a logical channel used for a point-to-multipoint downlink transmission of user plane information between a network and UEs in RRC Connected or Idle Mode. The user plane information on MTCH is MBMS Service specific and is sent to the UEs in a cell with an activated MBMS service. The MTCH is mapped to a specific FACH in the S-CCPCH as indicated on the MCCH.

In general, an MBMS point-to-multipoint Scheduling Channel (MSCH) is a logical channel used for a point-to-multipoint downlink transmission of an MBMS service transmission schedule between a network and UEs in RRC Connected or Idle Mode. Control plane information on MSCH is MBMS service and S-CCPCH specific and is sent to the UEs in a cell receiving MTCH. An MSCH is sent in each S-CCPCH carrying the MTCH. The MSCH is mapped to a specific FACH in the S-CCPCH as indicated on the MCCH. Due to different error requirements, the MSCH is mapped to a FACH different from the MTCH.

In general, FACH is used as a transport channel for MTCH, MSCH and MCCH. Moreover, S-CCPCH is used as a physical channel for FACH carrying the MTCH, MSCH or MCCH.

In general, the following connections between logical channels and transport channels exist only in downlink: 1) MCCH can be mapped to FACH; 2) MTCH can be mapped to FACH; and 3) MSCH can be mapped to FACH. The mappings as seen from the UE and UTRAN sides are shown in FIG. 8 and FIG. 9, respectively.

For MCCH, the RLC mode to be employed is UM-RLC, with required enhancements to support out-of-sequence SDU delivery. A MAC header is used for logical channel type identification.

For MTCH, the RLC mode to be employed is UM-RLC, with required enhancements to support selective combining. Quick repeat may be used in RLC-UM. A MAC header is used for logical channel type identification and MBMS service identification.

For MSCH, the RLC mode to be employed is UM-RLC. A MAC header is used for logical channel type identification.

MBMS notification utilizes an MBMS specific PICH called an MBMS Notification Indicator Channel (MICH) in a cell. Coding for the MICH is defined in Stage-3 physical layer specifications.

In general, MCCH information is transmitted based on a fixed schedule, wherein the schedule identifies the TTI (Transmission Time interval), i.e., multiple of frames containing the beginning of the MCCH information. The transmission of the MCCH information can take a variable number of TTIs, and the UTRAN preferably transmits the MCCH information in consecutive TTIs. The UE will continue to receive the S-CCPCH until: 1) the UE receives all of the MCCH information; 2) the UE receives a TTI that does not include any MCCH data; or 3) information contents indicate that further reception is not required (e.g., no modification to the desired service information).

Based on this behavior, the UTRAN can repeat the MCCH information following a scheduled transmission in order to improve reliability. The MCCH schedule is common for all services.

All MCCH information will be transmitted periodically based on a "repetition period". A "modification period" is defined as an integer multiple of the repetition period. MBMS ACCESS INFORMATION may be transmitted periodically based on an "access info period", which is an integer divider of the "repetition period". The values for the repetition period and modification period are given in the system information of the cell in which MBMS is sent.

MCCH information is split into critical and non-critical information. The critical information is made up of MBMS NEIGHBORING CELL INFORMATION, MBMS SERVICE INFORMATION and MBMS RADIO BEARER INFORMATION. The non-critical information corresponds to MBMS ACCESS INFORMATION. Changes to the critical information are applied at the first MCCH transmission of a modification period and at the beginning of each modification period. The UTRAN transmits MBMS CHANGE INFORMATION including MBMS service IDs whose MCCH information is modified at that modification period. The MBMS CHANGE INFORMATION is repeated at least once in each repetition period of that modification period. Changes to non-critical information can take place at any time.

FIG. 10 illustrates the schedule with which the MBMS SERVICE INFORMATION and RADIO BEARER INFORMATION is transmitted. Different block patterns indicate potentially different MCCH content.

In order to increase coverage, a UE which is located between different cells can receive the same MBMS services from different cells at the same time, and combine the received information as shown in FIG. 11. In this case, the UE reads the MCCH from a cell it has selected based on a certain algorithm.

Referring to FIG. 11, on the MCCH from the selected cell (e.g., cell A-B), the UE receives information on a service that the UE is interested in. This information contains information related to the configuration of physical channels, transport channels, an RLC configuration, a PDCP configuration, etc. of the current cell, and neighboring cells that the UE might be able to receive (e.g., cell A-A and cell B). In other words, the received information contains information that the UE needs in order to receive an MTCH carrying a service that the UE is interested in cells A-A, A-B and B.

When the same service is transported on different cells, the UE may or may not be able to combine the service from the different cells. In case that combining is possible, the combining is performed at different levels: 1) no combining possible; 2) selective combining at RLC level; and 3) L1 combining at physical level.

Selective combining for an MBMS point-to-multipoint transmission is supported by RLC PDU numbering. Therefore, selective combining in the UE is possible from cells providing similar MBMS RB bit rates, provided that de-synchronization between MBMS point-to-multipoint transmission streams does not exceed the RLC re-ordering capability of the UE. Thus, there exists one RLC entity in the UE side.

For selective combining, there exists one RLC entity per MBMS service utilizing a point-to-multipoint transmission in the cell group of the CRNC. All cells in the cell group are under the same CRNC. In case de-synchronization occurs between MBMS transmissions in neighboring cells belonging to an MBMS cell group, the CRNC may perform re-synchronization actions enabling UEs to perform the selective combining between these cells.

For time division duplexing (TDD), selective combining and soft combining can be used when Node-Bs are synchronized. For frequency division duplexing (FDD), soft combining can be used when Node-Bs are synchronized inside a UE's soft combining reception window, and the data fields of the soft combined S-CCPCHs are identical during soft combining moments.

When selective or soft combining is available between cells, the UTRAN sends MBMS NEIGHBORING CELL INFORMATION containing the MTCH configuration of the neighboring cells available for selective or soft combining. When partial soft combining is applied, the MBMS NEIGHBORING CELL INFORMATION contains an L1-combining schedule, which indicates the moments in time when the UE may soft combine the S-CCPCH transmitted in neighboring cells with the S-CCPCH transmitted in a serving cell. With MBMS NEIGHBORING CELL INFORMATION, the UE is able to receive an MTCH transmission from neighboring cells without receiving the MCCH of these neighboring cells.

The UE determines the neighboring cell suitable for selective or soft combining based on a threshold (e.g., measured CPICH Ec/No) and the presence of MBMS NEIGHBORING CELL INFORMATION of that neighboring cell. The possibility of performing selective or soft combining is signaled to the UE.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity.

FIG. 12 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3GPP LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB (eNB) 105 in the LTE system.

In 3GPP LTE systems, system information (SI) carries different cell and network specific parameters to a UE for successful attachment to a network. The system information also facilitates paging and allows the UE to use different network services. Every cell continually broadcasts its system information on a channel, such as a broadcast control channel (BCCH). Moreover, every UE registering to the network or performing a handover to a particular cell first reads the cell specific information.

Discontinuous Reception (DRX) is a method used in mobile communication to conserve the battery life of the mobile terminal. Generally, the mobile terminal and the network negotiate periods in which data transfer occurs. During other periods, the mobile terminal turns its receiver off and enters a low power state.

SUMMARY OF THE INVENTION

The present invention is related to communicating between a network and a mobile terminal in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for communicating between a network and a mobile terminal, the method comprising receiving a message from the network for announcing a service, wherein the message includes an attribute for identifying whether the service is to be received according to a specific mode, wherein the specific mode is a mode wherein information is communicated on a frequency having no associated uplink service, and wherein the attribute is included in the message according to a session description protocol describing the service.

Preferably, the specific mode is a single frequency network mode. In one aspect of the invention, the method further comprises facilitating reception of the service according to the specific mode if the attribute identifies that the service is to be received according to the specific mode. In another aspect of the invention, the method further comprises determining not to facilitate reception of the service according to the specific mode if the attribute identifies that the service is to be received according to a mode different from the specific mode. In a further aspect of the invention, the method further comprises facilitating reception according to the mode different from the specific mode if the attribute identifies that the service is to be received according to the mode different from the specific mode. In yet another aspect of the invention, the method further comprises facilitating reception of the service according to the specific mode if the attribute identifies that the service is not to be received according to a mode different from the specific mode.

In accordance with another embodiment of the present invention, a method for communicating between a network and a mobile terminal comprises transmitting a message to a mobile terminal for announcing a service, wherein the message includes an attribute for identifying whether the service is to be received by the mobile terminal according to a specific mode, wherein the specific mode is a mode wherein information is communicated on a frequency having no associated uplink service, and wherein the attribute is included in the message according to a session description protocol describing the service.

Preferably, the specific mode is a single frequency network mode. In one aspect of the invention, the mobile terminal facilitates reception of the service according to the specific mode if the attribute identifies that the service is to be received according to the specific mode. In another aspect of the invention, the mobile terminal determines not to facilitate reception of the service according to the specific mode if the attribute identifies that the service is to be received according to a mode different from the specific mode. In a further aspect of the invention, the mobile terminal facilitates reception according to the mode different from the specific mode if the attribute identifies that the service is to be received according to the mode different from the specific mode. In yet another aspect of the invention, the mobile terminal facilitates reception of the service according to the specific mode if the attribute identifies that the service is not to be received according to a mode different from the specific mode.

In accordance with another embodiment of the invention, a mobile terminal for communicating with a network in a wireless communication system comprises a receiver for receiving a message from the network for announcing a service, wherein the message includes an attribute for identifying whether the service is to be received according to a specific mode, wherein the specific mode is a mode wherein information is communicated on a frequency having no associated uplink service, and wherein the attribute is included in the message according to a session description protocol describing the service.

Preferably, the specific mode is a single frequency network mode. In one aspect of the invention, the mobile terminal further comprises a processor for facilitating reception of the service according to the specific mode if the attribute identifies that the service is to be received according to the specific mode. In another aspect of the invention, the mobile terminal further comprises a processor for determining not to facilitate reception of the service according to the specific mode if the attribute identifies that the service is to be received according to a mode different from the specific mode. In a further aspect of the invention, the mobile terminal further comprises a processor for facilitating reception according to the mode different from the specific mode if the attribute identifies that the service is to be received according to the mode different from the specific mode. In yet another aspect of the invention, the mobile terminal further comprises a processor for facilitating reception of the service according to the specific mode if the attribute identifies that the service is not to be received according to a mode different from the specific mode.

In accordance with another embodiment of the present invention, a network for communicating with a mobile terminal in a wireless communication system comprises a transmitter for transmitting a message to a mobile terminal for announcing a service, wherein the message includes an attribute for identifying whether the service is to be received by the mobile terminal according to a specific mode, wherein the specific mode is a mode wherein information is communicated on a frequency having no associated uplink service, and wherein the attribute is included in the message according to a session description protocol describing the service. Preferably, the specific mode is a single frequency network mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 18(*b*) illustrates a UE with MBSFN capability in accordance with one embodiment of the present invention.

DETAILED DESCRIPTION OF THE PREFERRED EMBODIMENTS

The present invention relates to communicating between a network and a mobile terminal in a wireless communication system.

Reference will now be made in detail to the preferred embodiments of the present invention, examples of which are illustrated in the accompanying drawings. Wherever possible, the same reference numbers will be used throughout the drawings to refer to the same or similar parts.

A multimedia broadcast multicast service (MBMS) can operate in an MBMS over Single Frequency Network (MBSFN) mode, which provides more efficient data transmission on the physical layer in both UMTS FDD and TDD. In accordance with the present invention, signaling is provided from a network to a user equipment (UE), wherein a transmission is available in MBSFN mode. Moreover, backwards compatibility is provided for UEs not supporting the MBSFN mode.

MBMS is a point-to-multipoint service in which data is transmitted from a single source entity to multiple recipients. Transmitting the same data to multiple recipients allows network resources to be shared. The MBMS bearer service offers two modes: 1) a broadcast mode; and 2) a multicast mode.

MBMS architecture enables the efficient usage of radio-network and core-network resources, with an emphasis on radio interface efficiency. MBMS may be realized by adding new capabilities to existing functional entities of a 3GPP architecture and by adding new functional entities.

Existing PS domain functional entities, such as GGSN, SGSN, UTRAN, GERAN and UE may be enhanced to provide an MBMS bearer service. In the bearer plane, the MBMS bearer service provides delivery of IP multicast datagrams from a Gi reference point to UEs with a specified quality of service. In the control plane, the MBMS bearer service provides mechanisms for: 1) managing MBMS bearer service activation status of UEs (multicast mode); 2) outsourcing authorization decisions to an MBMS user service, i.e. to the BM-SC (multicast mode); and 3) providing control of session initiation/termination by the MBMS user service and managing bearer resources for the distribution of MBMS data (multicast and broadcast modes). A particular instance of an MBMS bearer service is identified by an IP multicast address and an APN network identifier.

Figure 1:
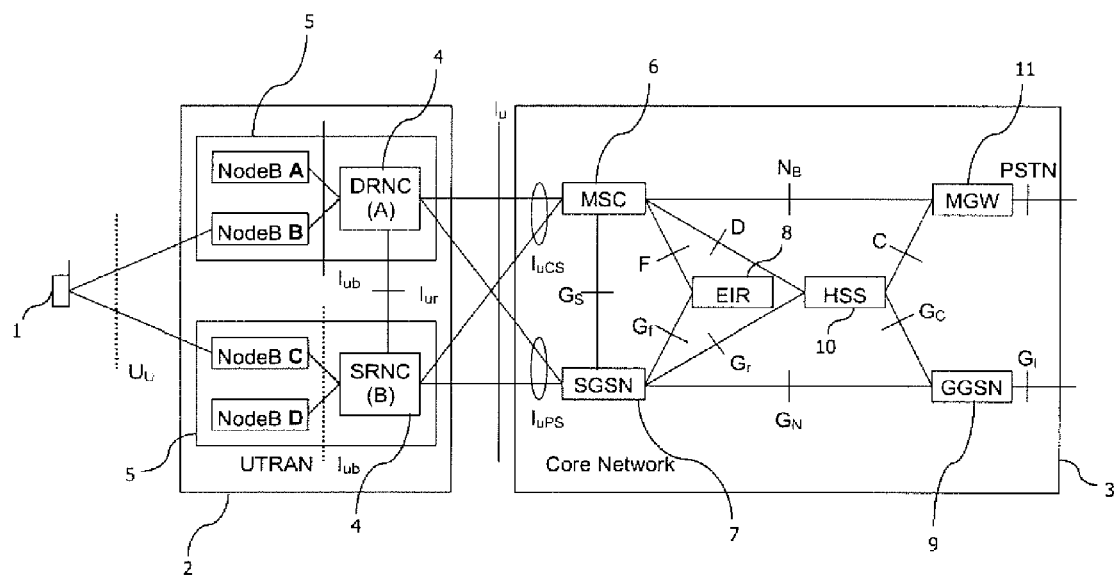
FIG. 1 illustrates a conventional UMTS network.
Figure 2:
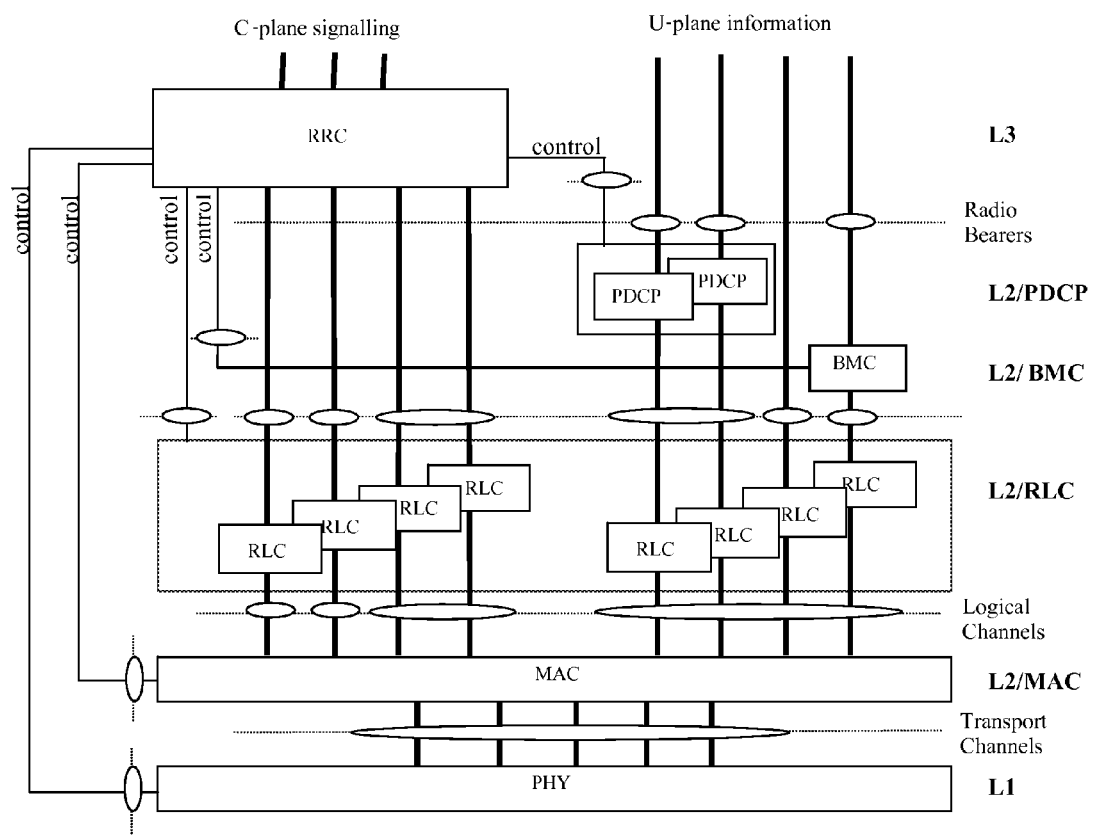
FIG. 2 illustrates a conventional radio interface protocol between a UE and UTRAN.
Figure 3:
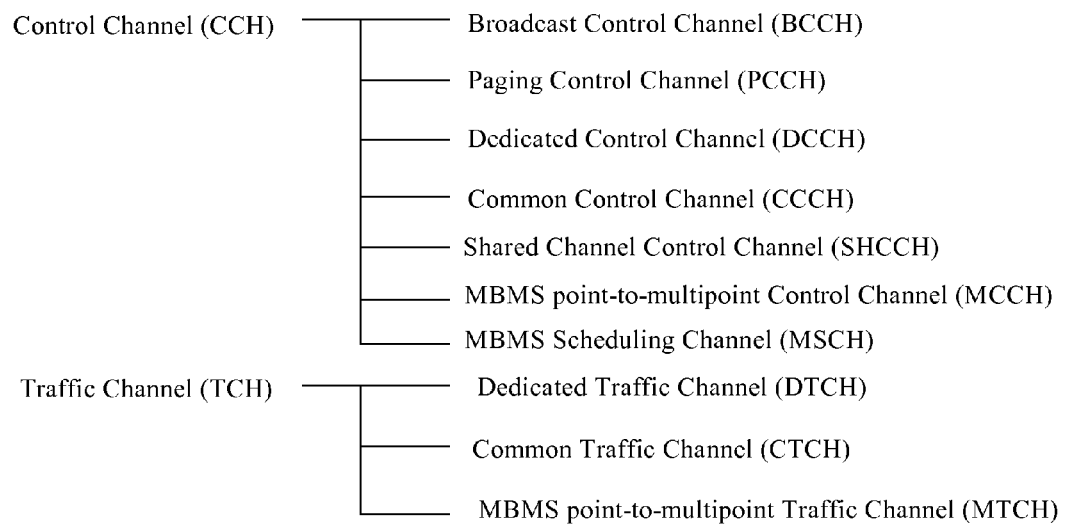
FIG. 3 illustrates logical channel structure.
Figure 4:
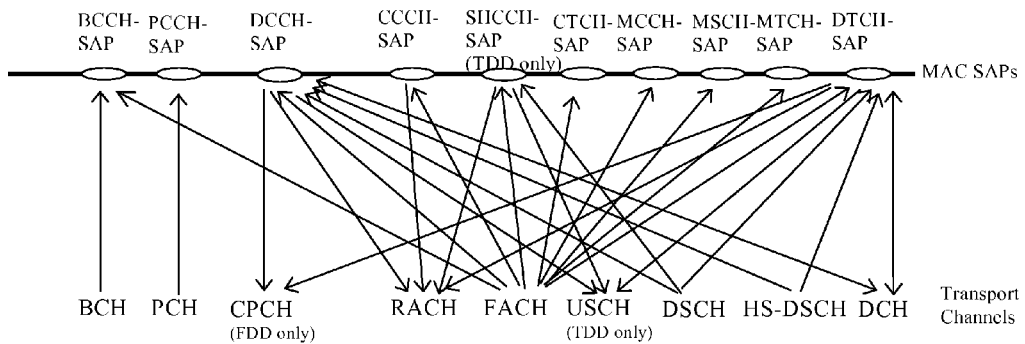
FIG. 4 illustrates possible mappings between logical channels and transport channels from the UE perspective.
Figure 5:
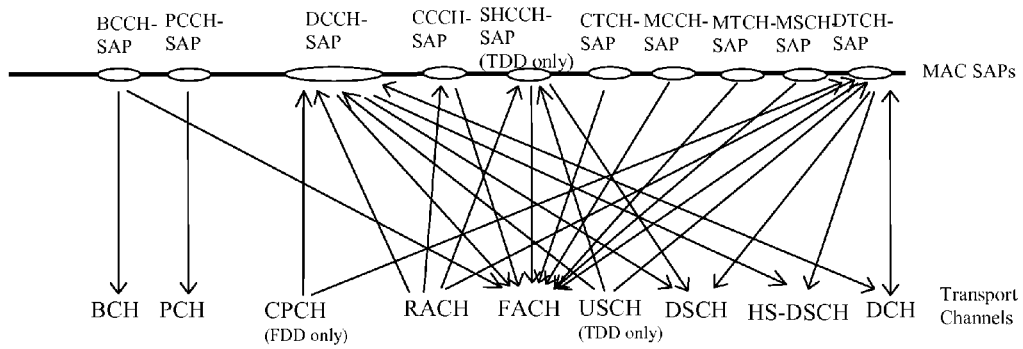
FIG. 5 illustrates possible mappings between logical channels and transport channels from the UTRAN perspective.
Figure 6:
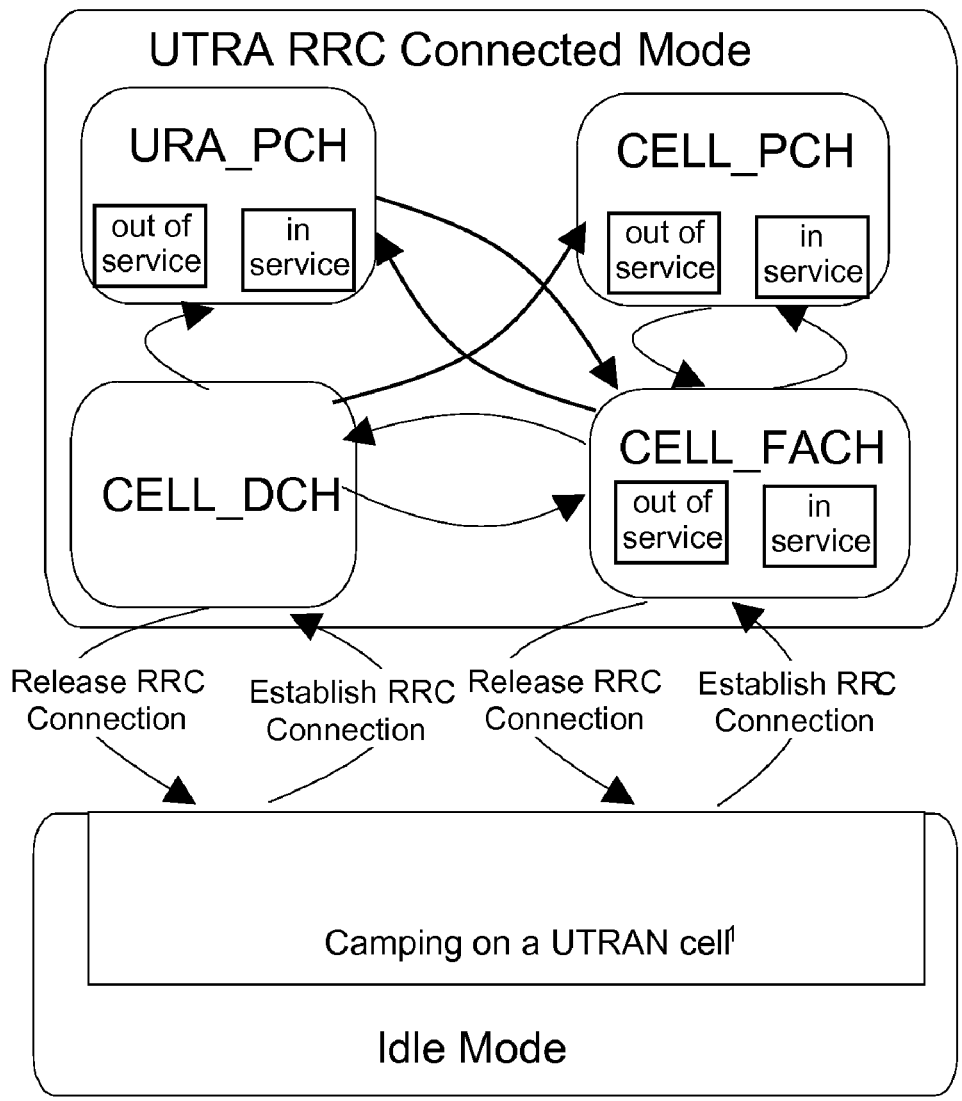
FIG. 6 illustrates possible UE state transitions.
Figure 7:
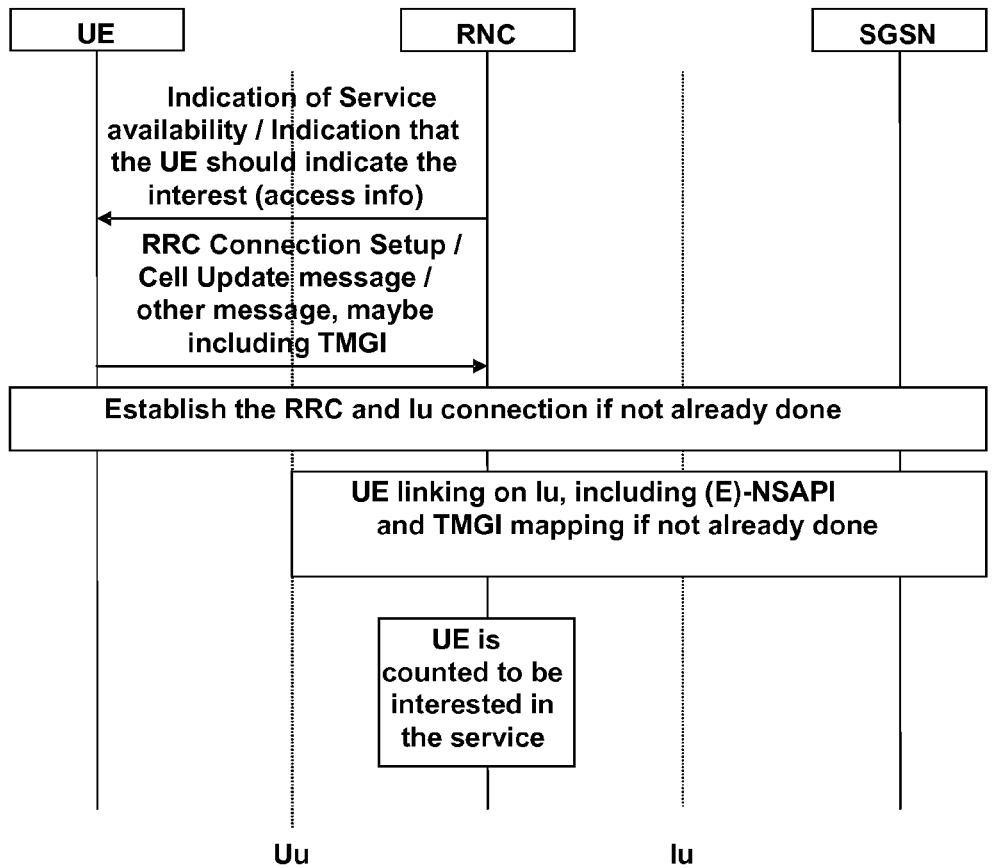
FIG. 7 illustrates a typical counting procedure.
Figure 8:
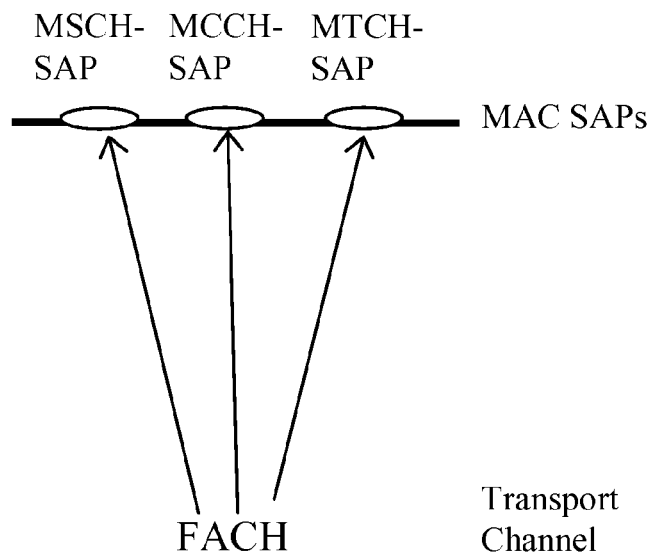
FIG. 8 illustrates mapping between logical channels and a transport channel as seen from the UE perspective.
Figure 9:
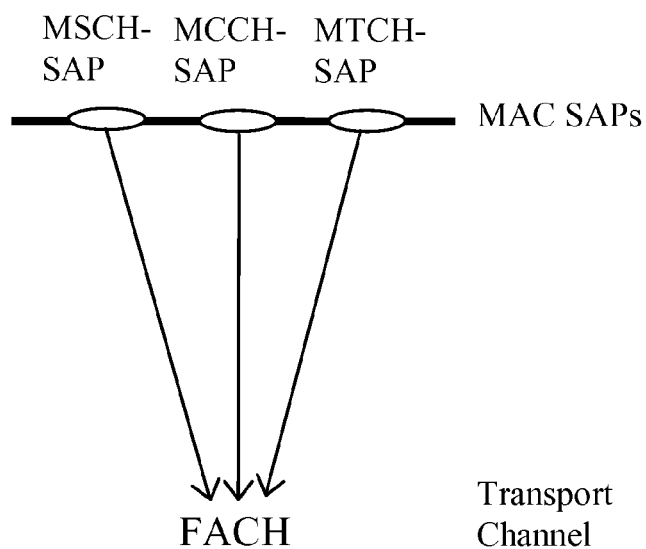
FIG. 9 illustrates mapping between logical channels and a transport channel as seen from the UTRAN perspective.
Figure 10:
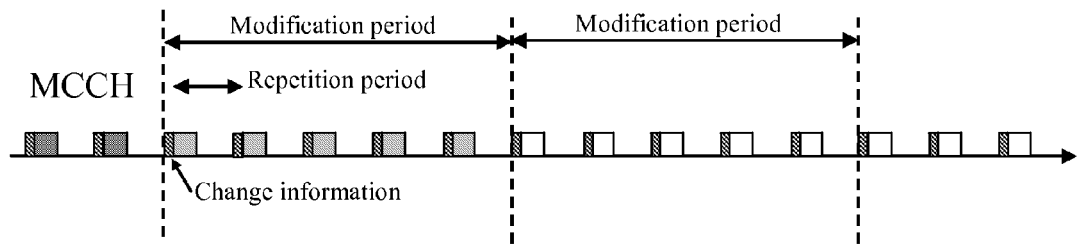
FIG. 10 illustrates a schedule with which the MBMS service information and radio bearer information is transmitted.
Figure 11:
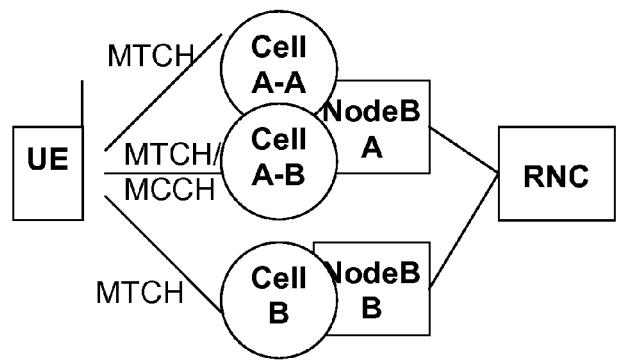
FIG. 11 illustrates a UE receiving MBMS service from several cells.
Figure 12:
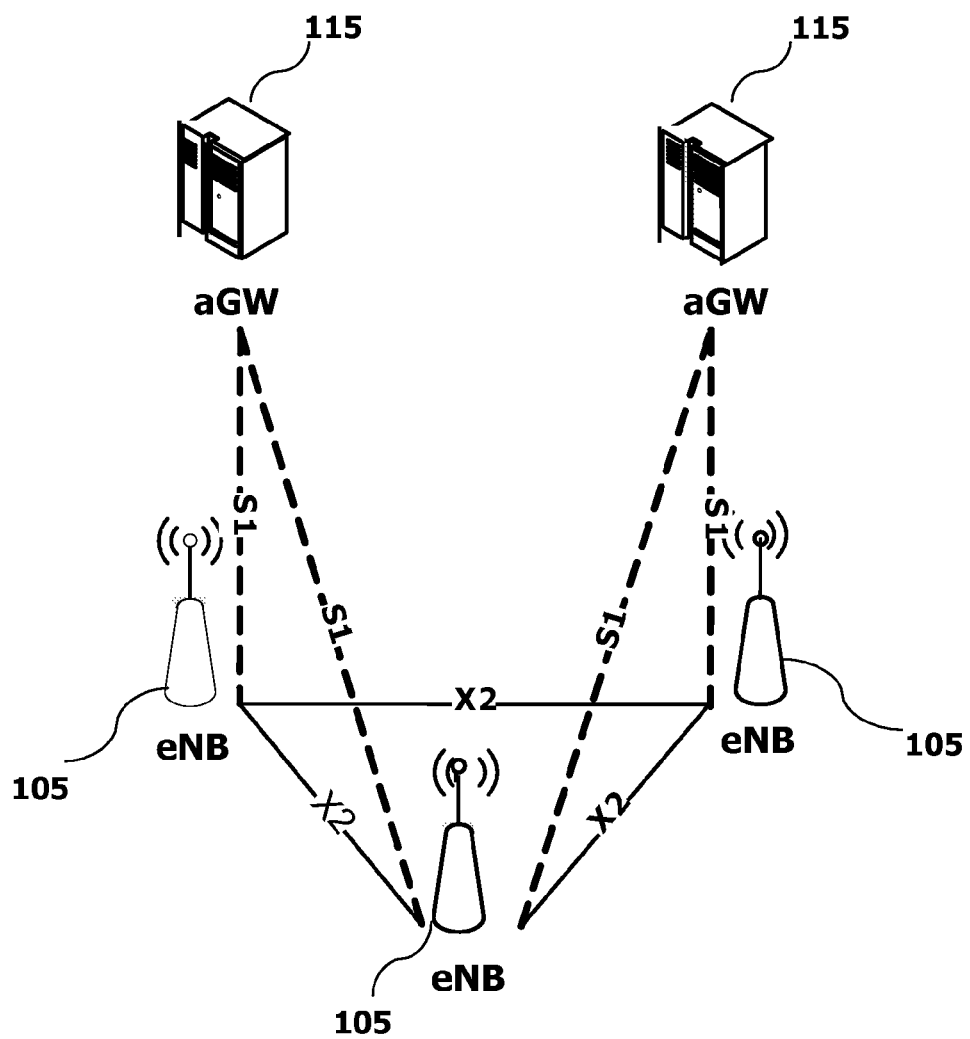
FIG. 12 illustrates the architecture of an LTE system.
Figure 13:
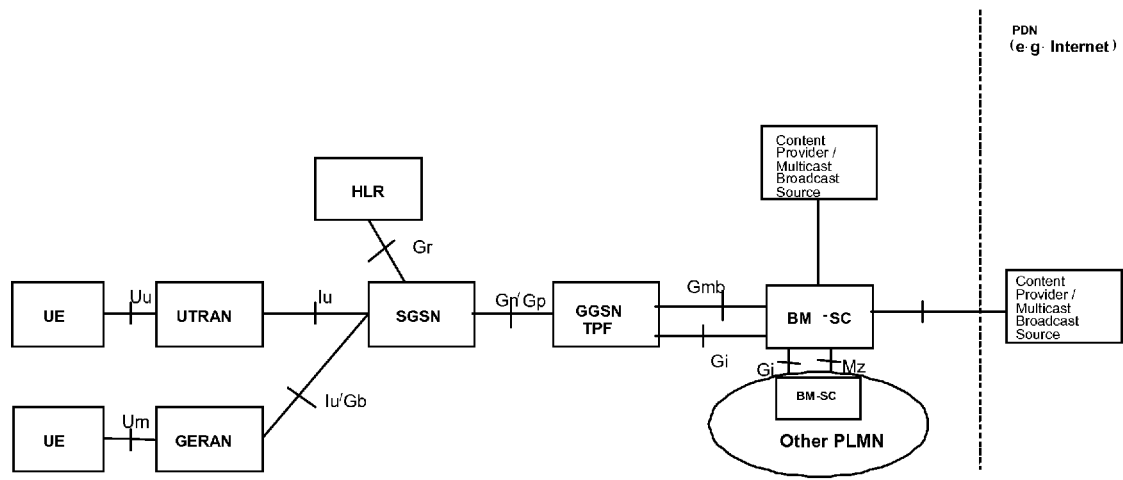
FIG. 13 illustrates reference architecture for supporting an MBMS bearer service.

FIG. 13 illustrates reference architecture for supporting an MBMS bearer service. As shown in FIG. 13, the boundary of the MBMS bearer service are the Gmb and Gi reference points. The Gmb reference point provides access to control plane functions. The Gi reference point provides access to the bearer plane. A Broadcast Multicast Service Centre (BM-SC) is a functional entity that provides a set of functions for MBMS user services. BM-SC functions for different MBMS user services may be supported from the same or different physical network elements.

Figure 14:
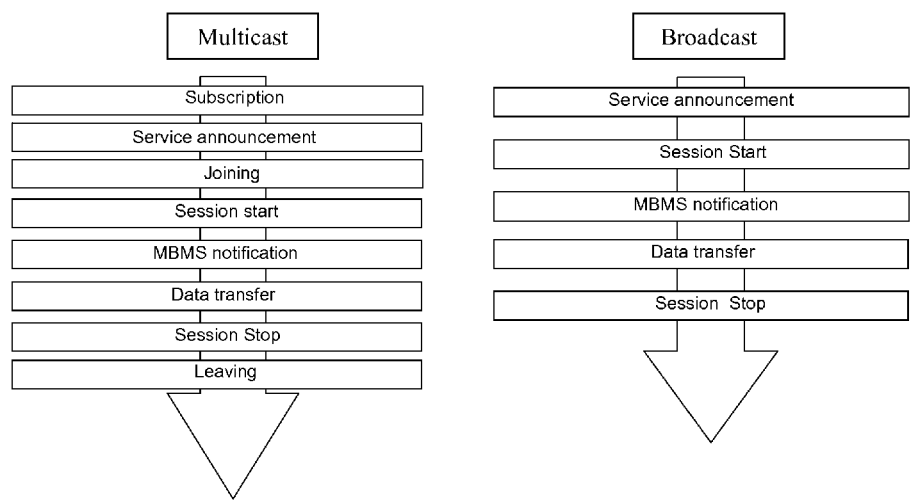
FIG. 14 illustrates phases of multicast and broadcast service provision.

As stated above, the MBMS bearer service can work in two modes, a broadcast mode or a multicast mode. An example of the phases of multicast and broadcast service provision is shown in FIG. 14.

Figure 15:
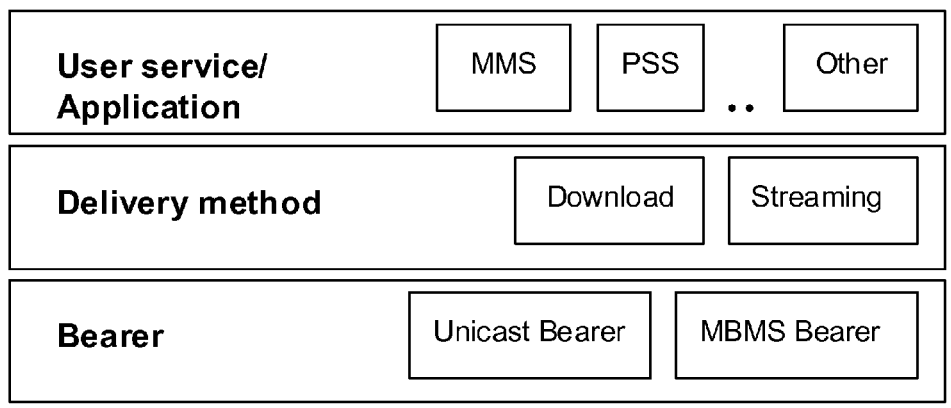
FIG. 15 illustrates three MBMS functional layers with examples of bearer types, delivery methods and applications.

Three distinct MBMS functional layers may be defined for the delivery of an MBMS-based service. They include a bearer layer, a delivery method layer and a user service/application layer. FIG. 15 illustrates three MBMS functional layers with examples of bearer types, delivery methods and applications.

Bearers provide a mechanism by which Internet protocol (IP) data is transported. MBMS bearers may be used to transport multicast and broadcast traffic in an efficient one-to-many manner and are the foundation of MBMS-based services. MBMS bearers may be used jointly with unicast PDP contexts in offering complete service capabilities.

When delivering MBMS content to a receiving application, one or more delivery methods are used. The delivery method layer provides functionality, such as security and key distribution, reliability control by means of forward-error-correction techniques, and associated delivery procedures such as file-repair and delivery verification. Two types of delivery methods include download and streaming. Delivery methods may use MBMS bearers and make use of point-to-point bearers through a set of MBMS associated procedures.

Figure 16:
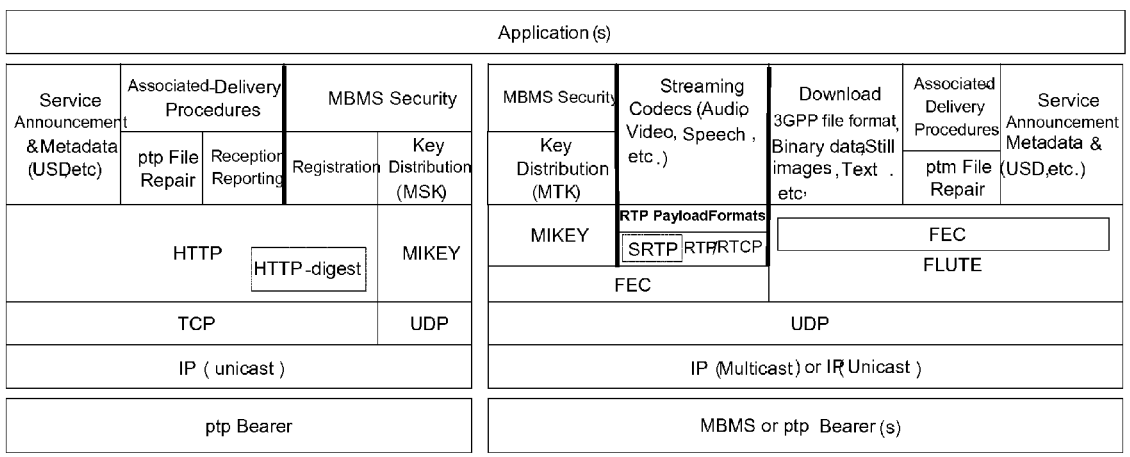
FIG. 16 illustrates a protocol stack used by MBMS user services.

The MBMS user service enables applications. Different applications impose different requirements when delivering content to MBMS subscribers and may use different MBMS delivery methods. For example, a messaging application such as MMS may use a download delivery method while a streaming application such as PSS may use a streaming delivery method. FIG. 16 illustrates a protocol stack used by MBMS user services.

In contrast to frequency division duplexing (FDD), downlink macro diversity is not characteristic of time division duplexing (TDD). As such, TDD receivers are not typically designed to facilitate simultaneous reception of multiple radio links. Thus, requiring such simultaneous reception of multiple radio links for MBMS would have non-trivial impacts on TDD receiver design. However, much of the receiver complexity increase associated with the combining of multiple radio links in the UE can be avoided in TDD by combining macro diversity with timeslot reuse. This also allows for throughput gains from timeslot reuse to be combined with further gains from macro diversity.

In such a scheme, transmissions of the same information from multiple participating cells are arranged such that they arrive at the UE on substantially different timeslots. Thus, the requirement for the UE to detect multiple cells in the same timeslot is removed.

Cells may be partitioned into transmission "groups" or "sets". Each transmission set is allocated a timeslot (or set of timeslots) for MBMS transmission. The assigned slots are typically exclusively used by that MBMS set. Sets do not transmit when another set is active. The UE attempts to receive information from each set and to combine them either at the physical layer or RLC layer in order to enhance reception reliability.

Figure 17:
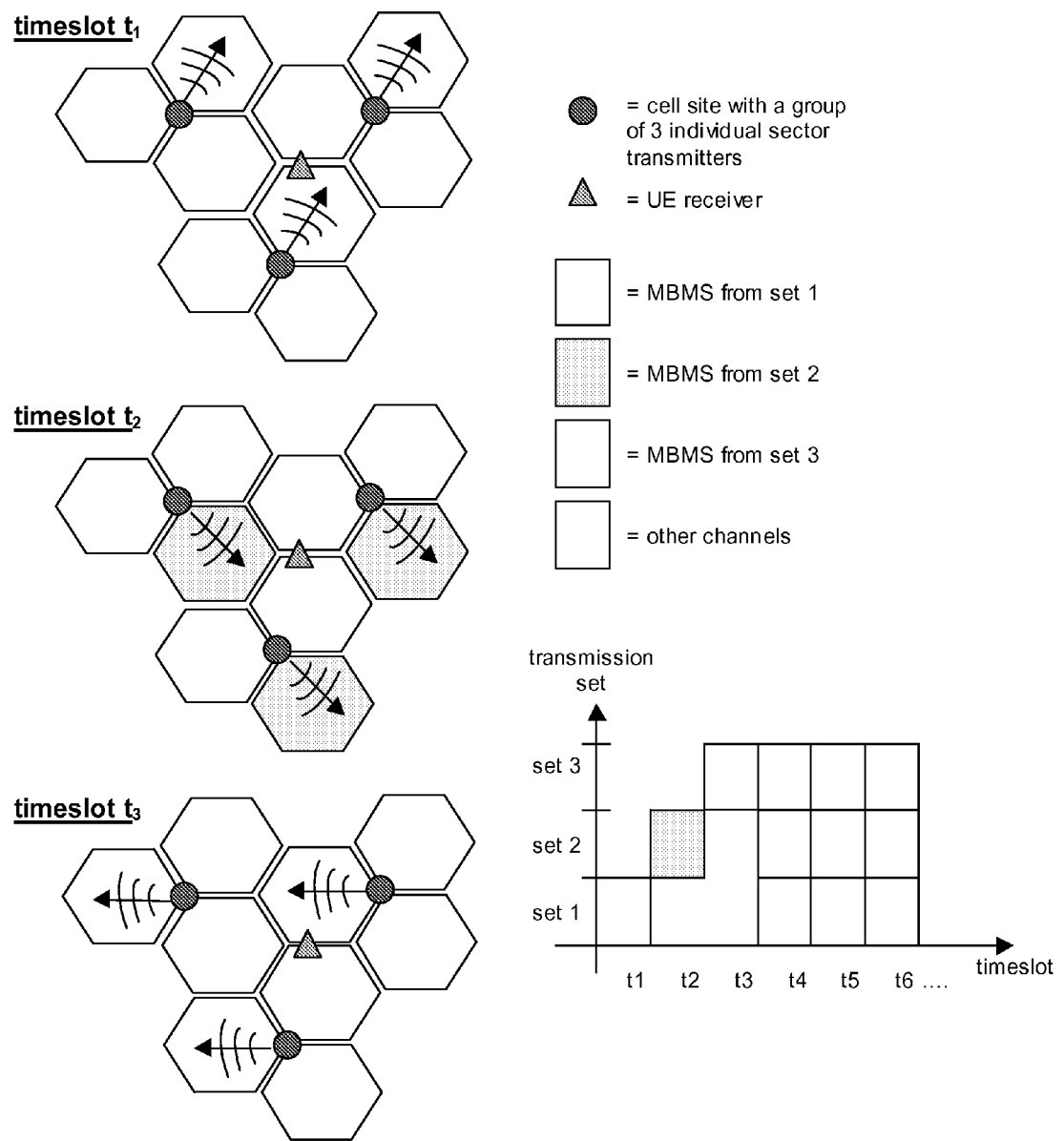
FIG. 17 illustrates a non-time-coincident macro diversity transmission, wherein a scheme is applied to a tri-sectored deployment model.

FIG. 17 illustrates a non-time-coincident macro diversity transmission, wherein a scheme is applied to a tri-sectored deployment model. Referring to FIG. 17, three timeslots ($t_1$, $t_2$ and $t_3$) are allocated to each sector for the purposes of MBMS transmission. Each sector is assigned to a particular "MBMS transmission set", set 1, 2 or 3.

An MBMS data unit or transport block may be encoded over several radio frames (e.g. 80 ms TTI). The physical channel bits that result are effectively transmitted three times, once by MBMS set 1 in timeslot $t_1$, once by MBMS set 2 in timeslot $t_2$, and once by MBMS set 3 in timeslot $t_3$.

A given UE may be configured to listen to separate transmissions of the MBMS physical channels (one from each set) which, over the course of the TTI, correspond to the MBMS transport block(s). The signals from each MBMS set are largely non-time-coincident and do not require the use of an extensively modified receiver architecture. A receiver architecture resembling that of a normal "single-radio-link" TDD receiver may be used.

The received transport blocks may be provided to the RLC layer for selective combining, or soft information may be buffered and combined across MBMS sets during the course of the TTI via physical layer soft combining. The UTRAN signals to the UE on the MCCH which services may be soft combined, and in which cells soft combination may occur. The cell group for soft combining may be different than the cell group for selective combining. The UE may assume that transmissions of a given service that may be soft combined take place in the same frame.

MBMS over a Single Frequency Network (MBSFN) is another form of combining used for point-to-multipoint transmissions. It is realized by utilizing the same scrambling code at a given moment in time by a group of cells covering a geographic area, and is applicable for FDD and TDD. Signals from multiple cells may be combined by the UE in the same manner as used for multipath signal components from a single cell.

UE reception of MBMS services provided in MBSFN mode does not affect UE behavior on a unicast carrier. UE mobility on the unicast carrier is especially not affected by the reception of MBMS services provided on a cell operating in MBSFN mode.

MBSFN requires all Node Bs involved in the simulcast transmission to be closely time synchronized, and the same content is delivered to each of the involved Node Bs. All involved Node Bs preferably share the same CRNC. Thus, the MBSFN area is limited to the area controlled by a single RNC.

For TDD, some or all timeslots may utilize an MBSFN mode of transmission. Such timeslots are configured by the RNC to use the same scrambling codes across participating Node Bs. Any non-MBSFN timeslots continue to use the scrambling codes associated with the cell ID. The timeslots operating in the MBSFN mode form together with the synchronized neighboring cells to transmit the same data over the MBSFN cluster.

For FDD, Node Bs participating in an MBSFN transmission do so on all slots of the radio frame. Thus, MBSFN transmission occupies an entire carrier in the case of FDD, whereas for TDD, part or all of the carrier may be used for MBSFN.

UEs supporting MBSFN may receive MBMS services via carriers operating in FDD or TDD MBSFN mode. The UEs supporting MBSFN may also receive unicast services and MBMS services not provided via MBSFN by another carrier.

Allied to MBSFN is the use of higher order modulation techniques (e.g. 16QAM) for S-CCPCH. In the case of 3.84/7.68 Mcps TDD, a new burst type is used to support a longer delay spread.

Reception of MBMS services over a network operating in MBSFN mode implies that the UE is registered to a public land mobile network (PLMN) in order to perform higher layer procedures such as subscription to MBMS broadcast services. The means by which a UE obtains details of services provided, subscribes to services it is interested in, and obtains any ciphering keys necessary to decrypt services, and/or means by which the services are delivered (MBSFN mode, frequency band used, etc.), may be outside the scope of 3GPP specifications. However, the UE may obtain service details via a point-to-point connection via the carrier used to provide unicast services.

The UE selects an MBSFN cluster to receive an MBMS service that is part of a registered or equivalent PLMN list. Notably, network sharing is supported on carriers operating in MBSFN mode using the possibility to broadcast multiple PLMNs in the MIB just as it is supported on carriers supporting unicast services.

For an MBSFN cluster in 1.28 Mcps TDD mode, there is neither a physical synchronization channel nor a pilot channel configured, and there is no MBSFN cluster selection/reselection process. Preferably, the UE wishing to receive MBMS services delivered in an MBSFN cluster must first synchronize with a non-MBSFN cell that the MBSFN cluster is associated with, and then search the MBSFN cluster with information indicated in the system information of the non-MBSFN cell. From the UE's perspective, the registered PLMN of the MBSFN cluster should be the same as the PLMN registered by the UE from the associated unicast carrier.

Preferably, an MBSFN cluster provides MBMS services in point-to-multipoint mode. Hence, counting and point-to-point establishment procedures may not be supported for a cell operating in MBSFN mode.

For FDD and 3.84/7.68 Mcps TDD, selection between MBSFN clusters is performed similarly to the way cell selection is performed for cells not operating in MBSFN mode. Preferably, the UE meets the minimum performance requirements specified for receiving an MBMS cluster. The UE may consider a minimum reception power of the CPICH (FDD) or P-CCPCH (3.84/7.68 Mcps TDD) in order to determine when to receive an MBMS service broadcast in MBSFN mode. However, apart from background search procedures for receiving other MBSFN clusters, the UE is not required to perform inter-frequency measurements for other MBSFN clusters. Hierarchical cell structure, rules for fast moving UEs, and inter frequency and inter RAT measurements are not applicable for the cell operating in MBSFN mode. Intra frequency measurements for the reselection between MBSFN clusters are not specified.

In an MBSFN cluster, only MIB and system information blocks 3, 5/5bis and 11 may be broadcast. The content of other system information blocks is ignored by the UE.

An MBSFN cluster on one frequency may indicate the existence of services provided by other MBSFN clusters on different frequencies. The MBSFN cluster on one frequency may also indicate other MBSFN frequencies that have to be selected in order for the UE to be aware of available services not provided or indicated on the currently selected MBSFN cluster. The choice of the MBSFN frequency based on this information is specific to a UE's implementation. Because inter frequency measurements for MBSFN frequencies are not applicable, the MBSFN frequency chosen by the UE may be completely service dependent. For FDD and 3.84/7.68 Mcps TDD, the UE has to only discover one MBMS cluster on another frequency that fulfills the selection criteria. Other frequencies on which an MBMS service is broadcast in MBSFN mode are indicated on the MBSFN frequency.

A cluster operating in MBSFN mode may not provide paging information because the MBSFN cluster may not be considered a suitable cell by the UE. The cells in an MBSFN cluster belong to different MBMS service areas compared to the cells of a carrier providing a unicast service. This allows the RNC to know which services are intended for transmission on the cells of an MBSFN cluster. The same MBMS bearer service is not provided on an MBSFN cluster and unicast cells. A minimum MBMS service area is preferably equal to one MBSFN cluster. An MBMS bearer service is preferably transmitted in a complete MBSFN cluster.

Session Description Protocol (SDP) is a format for describing streaming media initialization parameters. SDP describes multimedia sessions for the purposes of session announcement, session invitation, and other forms of multimedia session initiation. Initially, SDP was a component of Session Announcement Protocol (SAP), but other uses were found in conjunction with RTP and SIP, and as a standalone format for describing multicast sessions. Five terms related to SDP include: 1) conference; 2) session; 3) session announcement; 4) session advertisement; and 5) session description.

A conference is a set of two or more communicating users along with the software they are using. A session occurs when a multimedia sender and receiver exchange a flowing stream of data. A session announcement is a mechanism by which a session description is conveyed to users in a proactive fashion, i.e., the session description is not explicitly requested by a user prior to the session description being conveyed. A session advertisement is equivalent to the session announcement. A session description is a format for conveying sufficient information to discover and participate in a multimedia session.

An SDP session description is entirely textual using the ISO 10646 character set in UTF-8 encoding. SDP field names and attribute names use only the US-ASCII subset of UTF-8, but textual fields and attribute values may use the full ISO 10646 character set. Field and attribute values that use the full UTF-8 character set are not directly compared; hence, UTF-8 normalization is not required. The textual form, as opposed to a binary encoding such as ASN.1 or XDR, enhances portability to enable a variety of transports to be used, and to allow flexible, text-based toolkits to be used to generate and process session descriptions. However, since SDP may be used in environments where the maximum permissible size of a session description is limited, the encoding is preferably compact. Also, because announcements may be transported via unreliable means or damaged by an intermediate caching server, the encoding is designed with strict order and formatting rules so that most errors result in malformed session announcements that are easily detected and discarded. This also allows rapid discarding of encrypted session announcements for which a receiver does not have a correct key.

An SDP session description may comprise of a number of lines of text of the form:

<type>=<value> where <type> is exactly one case-significant character and <value> is structured text whose format depends on <type>. Preferably, <value> is either a number of fields delimited by a single space character or a free format string, and is case-significant unless a specific field defines otherwise. White or blank spaces are preferably not used on either side of the "=" sign.

An SDP session description comprises a session-level section followed by zero or more media-level sections. The session-level section starts with a "v=" line and continues to the first media-level section. Each media-level section starts with an "m=" line and continues to the next media-level section or end of the whole session description. In general, session-level values are the default for all media unless overridden by an equivalent media-level value.

Some lines in each description are required and some are optional, but all preferably appear in the order given below. Notably, the fixed order greatly enhances error detection and allows for a simple parser. Optional items are marked with a "*"

Session description
v=(protocol version)
o=(originator and session identifier)
s=(session name)
i=* (session information)
u=* (URI of description)
e=* (email address)
p=* (phone number)
c=* (connection information—not required if included in all media)
b=* (zero or more bandwidth information lines)
One or more time descriptions ("t=" and "r=" lines; see below)
z=* (time zone adjustments)
k=* (encryption key)
a=* (zero or more session attribute lines)
Zero or more media descriptions
Time description
t=(time the session is active)
r=* (zero or more repeat times)
Media description, if present
m=(media name and transport address)
i=* (media title)
c=* (connection information—optional if included at session level)
b=* (zero or more bandwidth information lines)
k=* (encryption key)
a=* (zero or more media attribute lines)

The set of type letters is preferably small and not intended to be extensible—an SDP parser completely ignores any session description that contains a type letter that it does not understand. The attribute mechanism ("a=" described above) is the primary means for extending SDP and tailoring it to particular applications or media. Some attributes have a defined meaning, but others may be added on an application-specific, media-specific, or session-specific basis. An SDP parser ignores any attribute it does not understand.

An SDP session description may contain URIs that reference external content in the "u=", "k=", and "a=" lines. These URIs may be dereferenced in some cases, making the session description non-self-contained.

The MBSFN mode is a transmission mode used to handle transmissions more efficiently. This implies that a service transmitted in MBSFN mode will be sent on a different frequency than a service not transmitted in MBSFN mode. Thus, in order to receive a service transmitted in MBSFN mode, the UE activates a separate receiver. If the UE previously knows whether a service is sent in MBSFN mode, the UE can switch off the MBSFN receiver if it is indicated that a given service is not transmitted in MBSFN mode. Therefore, the network preferably indicates to the UE whether a service is transmitted in MBSFN mode or not. Moreover, when the UE wants to receive a service for which it is indicated that the service is transmitted in MBSFN mode via an attribute of SDP, the UE will attempt to receive frequencies operating in MBSFN mode.

In accordance with the present invention, more efficient power management is provided when MBMS services can be received via two different carriers, wherein two or more separate receivers may be activated to receive services via the different carriers. Preferably, a separate receiver in the UE may be activated when additional information regarding an SFN transfer mode is available when a special signaling attribute is added in the SDP syntax.

Figure 18:
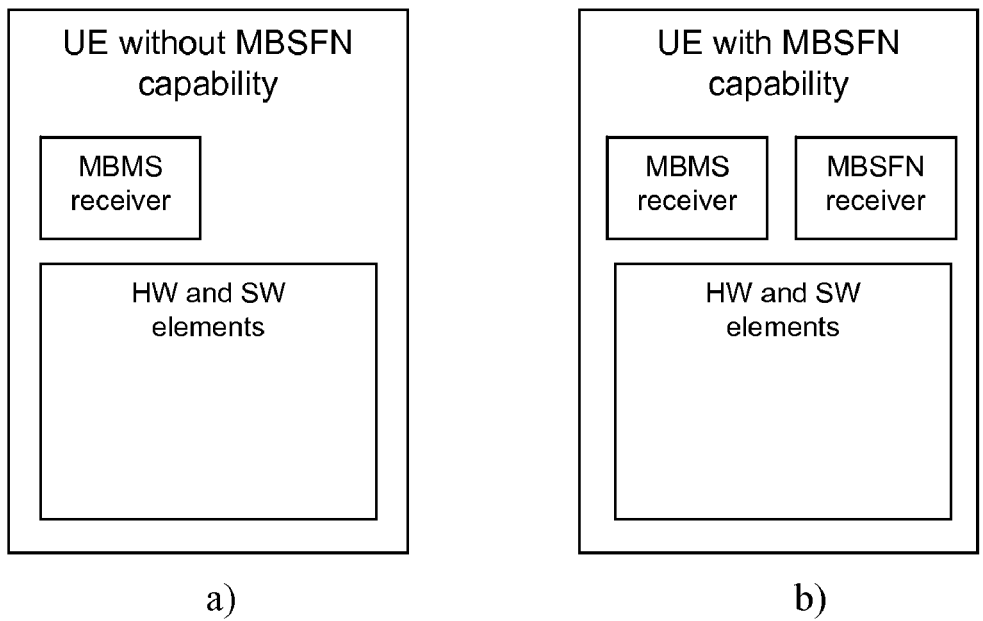
FIG. 18(*a*) illustrates a UE without MBSFN capability in accordance with one embodiment of the present invention.

MBMS over Single Frequency Network (MBSFN) mode is used for transmitting data more efficiently than conventional MBMS. FIG. 18(a) illustrates a UE without MBSFN capability in accordance with one embodiment of the present invention. FIG. 18(b) illustrates a UE with MBSFN capability in accordance with one embodiment of the present invention. The UE with MBSFN capability is equipped with an MBSFN receiver, which is a separate HW module capable of MBSFN reception.

Figure 19:
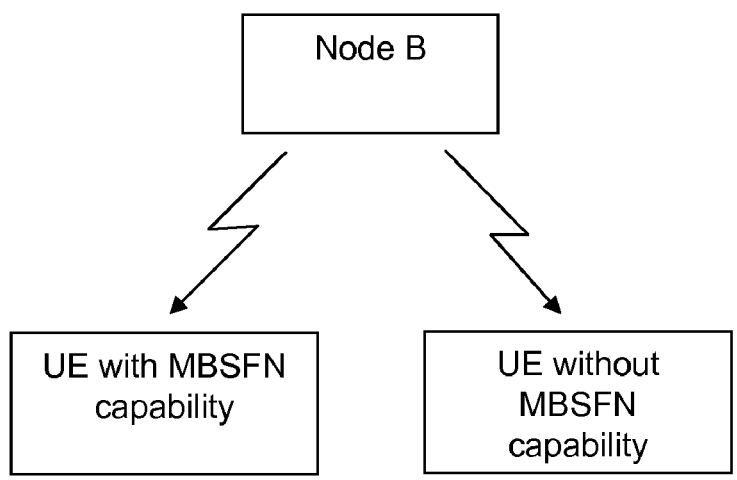
FIG. 19 illustrates a base station transmitting signals to a UE with MBSFN capability and a UE without MBSFN capability in accordance with one embodiment of the present invention.

FIG. 19 illustrates a base station transmitting signals to a UE with MBSFN capability and a UE without MBSFN capability in accordance with one embodiment of the present invention. Referring to FIG. 19, the present invention may be utilized for MBMS service provision for UEs with MBSFN capability and without MBSFN capability. Behavior of both kinds of user equipment is different.

Figure 20:
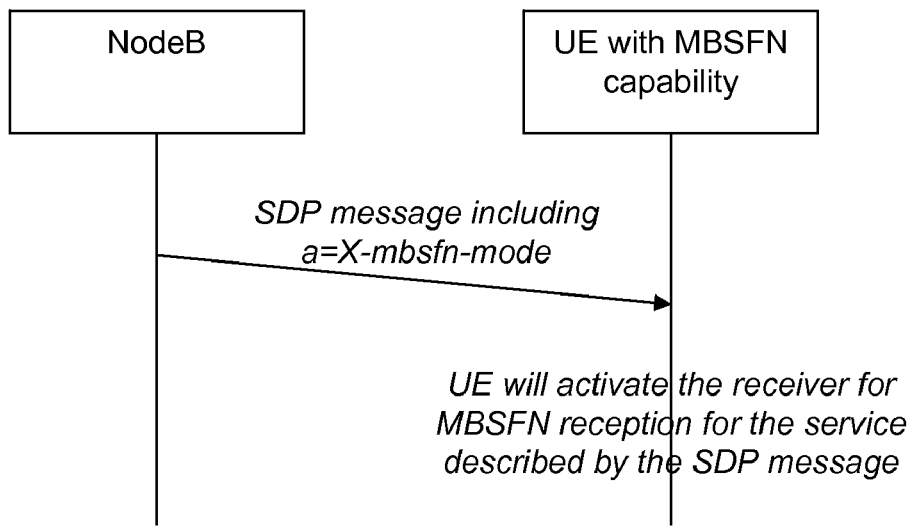
FIG. 20 illustrates a base station transmitting a signal to a UE with MBSFN capability in accordance with one embodiment of the present invention.
Figure 22:
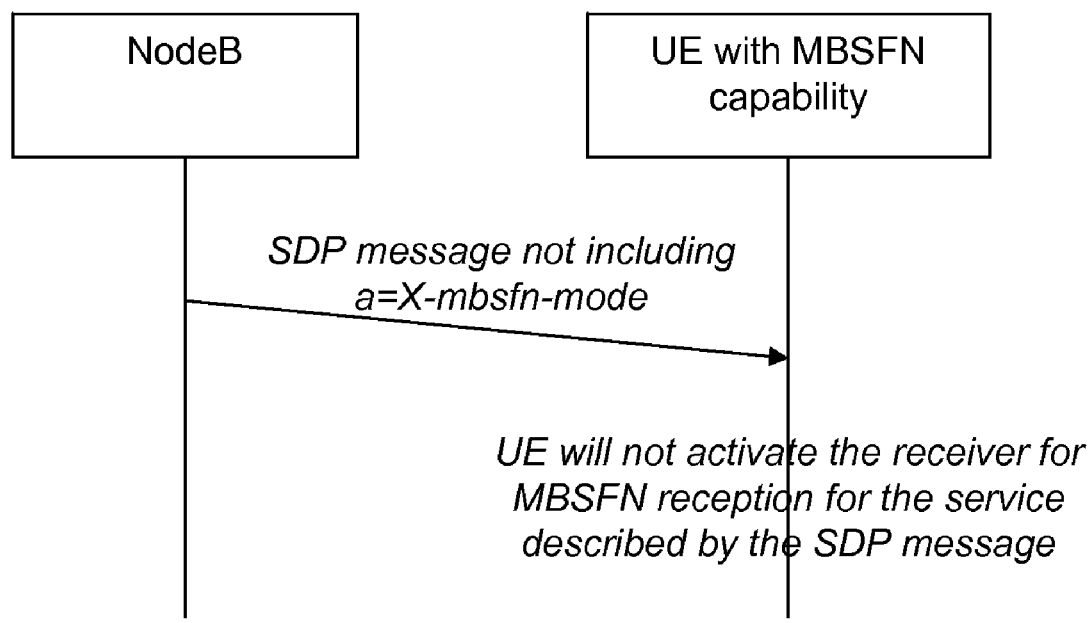
FIG. 22 illustrates a base station transmitting a signal to a UE with MBSFN capability, wherein the UE does not activate an MBSFN receiver in accordance with one embodiment of the present invention.

FIG. 20 illustrates a base station transmitting a signal to a UE with MBSFN capability in accordance with one embodiment of the present invention. Referring to FIG. 20, during establishment of an MBMS session, a UE with MBSFN capability receives an MBMS session parameters description protocol message which may include a signaling attribute, such as a=X-mbsfn-mode, to indicate that an MBMS service will be provided in MBSFN mode. Accordingly, if the attribute a=X-mbsfn-mode is present in the session description protocol, the UE knows to activate (switch on) the MBSFN receiver for receiving the MBMS session as a result of being informed via the attribute that the MBMS service will be provided in the MBSFN mode. However, if the attribute a=X-mbsfn-mode is not included in the session description protocol, as illustrated in FIG. 22, then the UE will know that the MBMS service is provided in a conventional (non-MBSFN) mode, and therefore not activate the MBSFN receiver.

Figure 21:
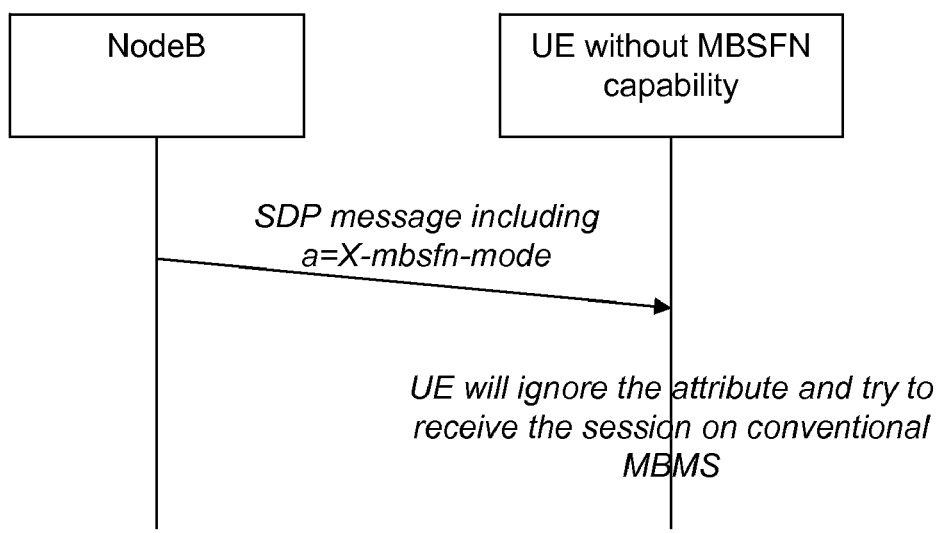
FIG. 21 illustrates a base station transmitting a signal to a UE without MBSFN capability in accordance with one embodiment of the present invention.

FIG. 21 illustrates a base station transmitting a signal to a UE without MBSFN capability in accordance with one embodiment of the present invention. Referring to FIG. 21, during establishment of an MBMS session, a UE without MBSFN capability receives an MBMS session parameters description protocol message including a signaling attribute, such as a=X-mbsfn-mode, to indicate that an MBMS service will be provided in MBSFN mode. However, because the UE is without MBSFN capability, the UE will ignore the attribute a=X-mbsfn-mode. Thus, if the UE wishes to receive the session, the UE will attempt to receive the session by conventional means (non-MBSFN means).

In accordance with the present invention, signaling of the MBMS session parameters is made according to a SDP syntax notation, described in the IETF RFC 4566. Below is an example of an SDP description of the MBMS FLUTE session parameters.

v=0
o=user123 2890844526 2890842807 IN IP6 2201:056D::112E:144A:1E24
s=File delivery session example
i=More information
t=2873397496 2873404696
a=mbms-mode:broadcast 1234 1
a=FEC-declaration:0 encoding-id=1
a=source-filter:incl IN IP6*2001:210:1:2:240:96FF:FE25:8EC9
a=flute-tsi:3 a=X-mbsfn-mode
m=application 12345 FLUTE/UDP 0
c=IN IP6 FF1E:03AD::7F2E:172A:1E24/1
b=64
a=lang:EN
a=FEC:0

In accordance with the present invention, a signal is communicated from a network to a UE for indicating that a service is provided in MBMS over SFN (MBSFN) mode, which provides an enhanced MBMS transmission on the physical layer in 3GPP Release 7 and beyond. The present invention also provides backwards compatibility with UEs not supporting the MBSFN mode.

In accordance with the present invention, a method of providing an MBMS service by radio network to a user equipment (UE) comprises providing the UE with information regarding a network's capability of transmitting an MBMS service over a Single Frequency Network (MBSFN mode) using an SDP protocol. The method may also provide a number of UEs capable of MBMS reception, wherein some UEs comprise a special module capable of receiving in MBSFN mode, and some UEs do not comprise such module. The method may also signal to the UE comprising an MBSFN receiver that a service is provided in the MBSFN mode by means of a special signaling attribute included in an MBMS session parameters description protocol. In response to receiving the special attribute included in the MBMS session parameters description protocol, the MBSFN receiver embedded in the UE may be activated. In case of the absence of the special attribute included in the MBMS session parameters description protocol, the MBSFN receiver embedded in the UE may be deactivated. Furthermore, the present invention provides backwards compatibility with UEs not supporting the MBSFN mode by allowing a UE without an MBSFN receiver to ignore the special signaling attribute upon receiving the attribute, and operate in a conventional MBMS mode.

Figure 23:
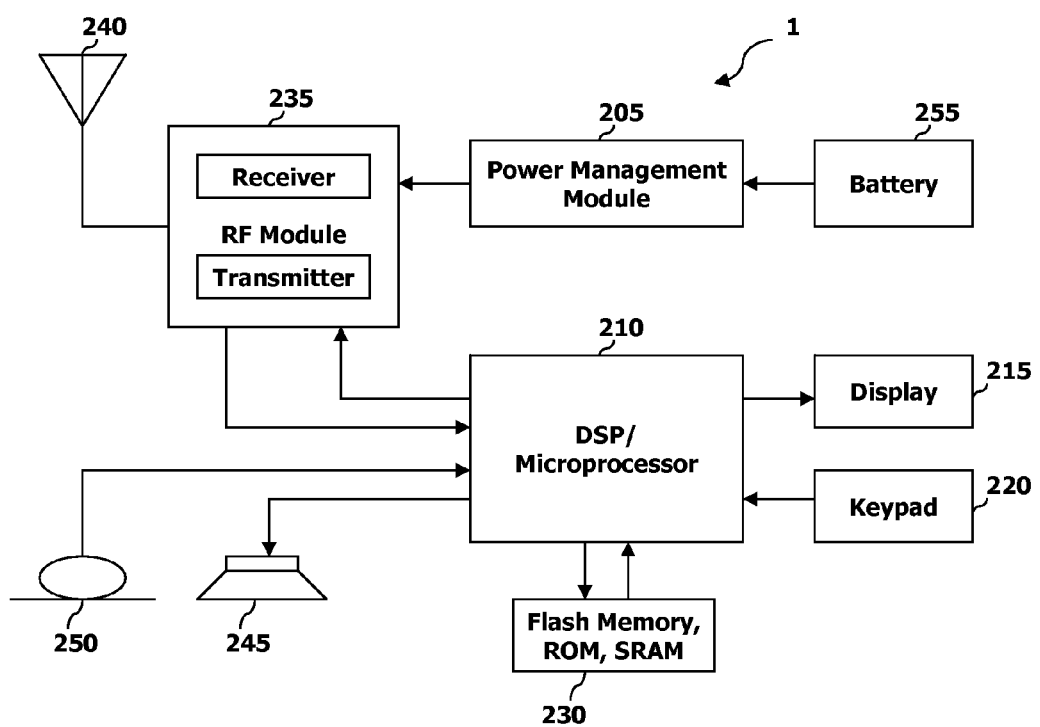
FIG. 23 illustrates a block diagram of a mobile station (MS) or UE in accordance with one embodiment of the present invention.

FIG. 23 illustrates a block diagram of a mobile station (MS) or UE 1 in accordance with the present invention. The UE 1 includes a processor (or digital signal processor) 210, RF module 235, power management module 205, antenna 240, battery 255, display 215, keypad 220, memory 230, speaker 245 and microphone 250.

A user enters instructional information, such as a telephone number, for example, by pushing the buttons of a keypad 220 or by voice activation using the microphone 250. The microprocessor 210 receives and processes the instructional information to perform the appropriate function, such as to dial the telephone number. Operational data may be retrieved from the memory module 230 to perform the function. Furthermore, the processor 210 may display the instructional and operational information on the display 215 for the user's reference and convenience.

The processor 210 issues instructional information to the RF module 235, to initiate communication, for example, transmits radio signals comprising voice communication data. The RF module 235 comprises a receiver and a transmitter to receive and transmit radio signals. An antenna 240 facilitates the transmission and reception of radio signals. Upon receiving radio signals, the RF module 235 may forward and convert the signals to baseband frequency for processing by the processor 210. The processed signals would be transformed into audible or readable information outputted via the speaker 245, for example. The processor 210 also includes the protocols and functions necessary to perform the various processes described herein.

It will be apparent to one skilled in the art that the mobile station 1 may be readily implemented using, for example, the processor 210 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for communicating between a network and a mobile terminal, the method comprising:
   receiving a message from the network for announcing a service, wherein the message includes an attribute for identifying whether the service is to be received according to a single frequency network (SFN) mode which combines signals from multiple cells;
facilitating reception of the service according to the SFN mode if the attribute identifies that the service is to be received according to the SFN mode;
determining not to facilitate reception of the service according to the SFN mode if the attribute identifies that the service is to be received according to a mode different from the SFN mode;
facilitating reception of the service according to the mode different from the SFN mode if the attribute identifies that the service is to be received according to the mode different from the SFN mode; and
facilitating reception of the service according to the SFN mode if the attribute identifies that the service is not to be received according to a mode different from the SFN mode,
wherein the SFN mode is a mode in which information is communicated on a frequency having no associated uplink service,
wherein the attribute is included in the message according to a session description protocol describing the service,
wherein the attribute is a signaling attribute identified at a session level to be applied to all media, and
wherein the attribute has a value of 'mbsfn-mode' when the attribute identifies that the service is to be received according to the SFN mode.

2. A method for communicating between a network and a mobile terminal, the method comprising:
transmitting a message to the mobile terminal for announcing a service,
wherein the message includes an attribute for identifying whether the service is to be received by the mobile terminal according to a single frequency network (SFN) which combines signals from multiple cells,
wherein the SFN mode is a mode in which information is communicated on a frequency having no associated uplink service,
wherein the attribute is included in the message according to a session description protocol describing the service,
wherein the mobile terminal facilitates reception of the service according to the SFN mode if the attribute identifies that the service is to be received according to the SFN mode;
wherein the mobile terminal determines not to facilitate reception of the service according to the SFN mode if the attribute identifies that the service is to be received according to a mode different from the SFN mode;
wherein the mobile terminal facilitates reception of the service according to the mode different from the SFN mode if the attribute identifies that the service is to be received according to the mode different from the SFN mode;
wherein the mobile terminal facilitates reception of the service according to the SFN mode if the attribute identifies that the service is not to be received according to a mode different from the SFN mode;
wherein the attribute is a signaling attribute identified at a session level to be applied to all media, and
wherein the attribute has a value of 'mbsfn-mode' when the attribute identifies that the service is to be received according to the SFN mode.

3. A mobile terminal for communicating with a network in a wireless communication system, the mobile terminal comprising:
a receiver for receiving a message from the network for announcing a service,
wherein the message includes an attribute for identifying whether the service is to be received according to a single frequency network (SFN) mode which combines signals from multiple cells;
a processor for facilitating reception of the service according to the SFN mode if the attribute identifies that the service is to be received according to the SFN mode, determining not to facilitate reception of the service according to the SFN mode if the attribute identifies that the service is to be received according to a mode different from the SFN mode, facilitating reception of the service according to the mode different from the SFN mode if the attribute identifies that the service is to be received according to the mode different from the SFN mode, and facilitating reception of the service according to the SFN mode if the attribute identifies that the service is not to be received according to a mode different from the SFN mode,
wherein the SFN mode is a mode in which information is communicated on a frequency having no associated uplink service,
wherein the attribute is included in the message according to a session description protocol describing the service,
wherein the attribute is a signaling attribute identified at a session level to be applied to all media, and
wherein the attribute has a value of 'mbsfn-mode' when the attribute identifies that the service is to be received according to the SFN mode.

4. A network for communicating with a mobile terminal in a wireless communication system, the network comprising:
a transmitter for transmitting a message to the mobile terminal for announcing a service,
wherein the message includes an attribute for identifying whether the service is to be received by the mobile terminal according to a single frequency network (SFN) mode which combines signals from multiple cells,
wherein the SFN mode is a mode in which information is communicated on a frequency having no associated uplink service,
wherein the attribute is included in the message according to a session description protocol describing the service,
wherein the mobile terminal facilitates reception of the service according to the SFN mode if the attribute identifies that the service is to be received according to the SFN mode,
wherein the mobile terminal determines not to facilitate reception of the service according to the SFN mode if the attribute identifies that the service is to be received according to a mode different from the SFN mode,
wherein the mobile terminal facilitates reception of the service according to the mode different from the SFN mode if the attribute identifies that the service is to be received according to the mode different from the SFN mode,
wherein the mobile terminal facilitates reception of the service according to the SFN mode if the attribute identifies that the service is not to be received according to a mode different from the SFN mode,
wherein the attribute is a signaling attribute identified at a session level to be applied to all media, and
wherein the attribute has a value of 'mbsfn-mode' when the attribute identifies that the service is to be received according to the SFN mode.

* * * * *